United States Patent [19]  [11] 3,865,604
Riedel et al.  [45] Feb. 11, 1975

[54] FLAME-RETARDANT REGENERATED CELLULOSE

[75] Inventors: Manfred Riedel, Binzen, Germany; Rainer Wolf, Allschwil Basel, Switzerland

[73] Assignee: Sandoz Ltd., Basel, Switzerland
[22] Filed: Apr. 2, 1973
[21] Appl. No.: 346,722

[30] Foreign Application Priority Data
Apr. 6, 1972   Switzerland.......................... 5028/72

[52] U.S. Cl................................. 106/168, 106/177
[51] Int. Cl...................... C08b 21/20, C08b 27/52
[58] Field of Search................ 106/168, 15 FP, 177; 260/2 P, 47 P, 927 N

[56] References Cited
UNITED STATES PATENTS
3,164,556  1/1965  Apley.................................. 260/2 P
3,505,087  4/1970  Godfrey............................. 106/168
3,676,311  7/1972  Frank................................. 260/2 P Primary Examiner—Theodore Morris
Attorney, Agent, or Firm—Gerald D. Sharkin; Richard E. Vila; Thomas C. Doyle

[57] ABSTRACT

The products of the reaction between $(NPCl_2)n$, where n is at least 3, and a glycol are used as flame retardants in the production of regenerated cellulose materials of reduced flammability. Production of regenerated cellulose materials of reduced flammability is effected by precipitating the cellulose from a solution containing the above mentioned products.

20 Claims, No Drawings

FLAME-RETARDANT REGENERATED CELLULOSE

The present invention relates to regenerated cellulosic materials of reduced flammability.

In the production of regenerated cellulose or cellulose derivatives by precipitating cellulose or cellulose derivatives from solution, it is known to incorporate in the solution to be precipitated various flame retardants to reduce the flammability of the resulting regenerated cellulosic material.

The present invention resides in the use as such a flame retardant, of a reaction product of
a. at least one compound of formula I,

$$(NPCl_2)_n \qquad \qquad I$$

in which $n$ signifies at least 3, and
b. at least one compound of formula II,

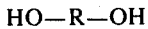

$$HO-R-OH \qquad \qquad II$$

in which R signifies a radical selected from alkylene, cycloalkylene, cycloalkylalkylene, alkenylene and alkynylene, which radical contains up to 12 carbon atoms and is unsubstituted or substituted
 i. by 1 to 4 substitutents selected from halogen, alkyl of 1 to 4 carbon atoms, the carbon atoms of which may be linked through oxygen atoms, and mono- di- or tri-haloalkyl of 1 to 4 carbon atoms, the carbon atoms of which may be linked through oxygen atoms,
 ii. by 1 or 2 alkoxy or alkenyloxy radicals of 1 to 4 carbon atoms, or
 iii. by 1 phenyl radical The invention accordingly provides regenerated cellulose or cellulose derivatives incorporating a reaction product mentioned above.

The invention also provides a process for the production of such regenerated cellulose and cellulose derivatives, which comprises precipitating cellulose or a cellulose derivative from a solution of cellulose or cellulose derivatives, containing a reaction product as defined above.

The precipitation is carried out in standard manner employing conventional precipitating or coagulating baths. The precipitation is suitably carried out under standard conditions for imparting the desired shape and dimensions to the solidified material, for example by spinning through fine orifices to produce filaments or by extrusion through slot dies to produce films. On solidification, a regenerated cellulosic material is produced which incorporates the reaction product as defined above.

The quantity of the reaction product required to impart the reduced flammability to the regenerated cellulose or derivative thereof may vary within wide limits. However, the regenerated cellulose or derivative thereof and the solution from which it is precipitated, suitably contains from 4 to 35%, preferably 7 to 25%, more preferably 8 to 15% of the reaction product, defined above, based on the weight of the cellulose or derivative thereof.

Suitable cellulosic solutions from which the regenerated cellulosic material is precipitated arw wellknown.

Thus, cellulose may be dissolved in conventional manner or converted into a soluble intermediate such as cuprammonium cellulose, by reaction with tetramine copper (II) hydroxide, or cellulose xanthate, by reaction with carbon disulphide, and then dissolved. The flame retardants of the invention may suitably be added, preferably with thorough stirring, to the cellulosic solution, either continuously or discontinuously. Alternatively, the flame retardants may suitably be dissolved in an organic solvent, preferably a water-immiscible solvent, for example a chlorinated hydrocarbon, eg. trichloroethylene, and the resulting solution added to the cellulosic solution. Another applicable method, is to disperse the indicated reaction product in water and run the resulting fine dispersion into the cellulosic solution. Whichever method is employed, it may be advantageous to add a dispersion stabiliser or dispersing agent to the solution or dispersion. As a dispersing agent, it is preferred to use a carboxy methylalkylphenol poly (50) glycol ether.

The flame retardants employed in the invention comprise, as indicated, a reaction product of at least one compound of formula I and at least one compound of formula II. Such reaction products are, generally known and may be prepared in conventional manner. Thus, the reaction, which takes place with elimination of hydrogen chloride, may suitably be effected in an inert organic solvent, such as a halogenated alkane, toluene, chlorobenzene or tetrahydrofuran, and in the presence of an acid binding agent, such as pyridine, a trialkylamine or calcium oxide. The reaction is preferably conducted under anhydrous conditions. The ratio of the quantities of the compounds I and II is suitably adjusted such that equivalent amounts of chlorine and hydroxy are present in the reaction mixture. Alternatively, an excess of chlorine may be present. In either case, the reaction products may contain unreacted chlorine.

The compounds of formula I are capable of reacting in various ways with the glycols of formula II so that the reaction product may comprise a heterogeneous mixture of individual products. In some cases ring formation may take place resulting in units of formula,

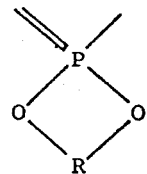

and, in other cases, intermolecular bridge members of formula

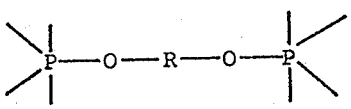

may be formed.

As indicated, a single compound of formula II or a mixture of such compounds may be employed. In the latter case, the product is of course more heterogeneous. Also, a mixture of compounds of formula I may be used.

The resulting reaction products, which are generally crystalline or oily substances, may be isolated and purified using conventional techniques. Advantageously, however, the reaction products may be used directly in the process of the invention without a purification step.

Compounds of formula I are known and may be produced in conventional manner, for example by reaction of phosphorus pentachloride with ammonium halides, as described by S. Pantel and M. Beck-Goehring in "Anorganische und allgemeine Chemie in Einzeldarstellungen," Volume 10, under the title "6- und 8-Gliedrige-Ringsysteme in der Phosphor-Stickstoff Chemie." Generally, a mixture of products of formula I results, which mixture may be reacted directly with compounds of formula II.

In the preferred compounds of formula I, $n$ signifies 3 to 12, in particular 3 or 4.

The compounds of formula II are also known or producible in conventional manner.

When R signifies an alkylene, alkenylene or alkynylene radical, such radical may be straight-chain or branched. Suitable alkylene radicals contain 2 to 12, in particular 3 to 8, preferably 3 to 6 carbon atoms. Suitable alkenylene radicals contain 3 to 12, in particular 4 to 8, more particularly 4 to 6 carbon atoms, eg —CH$_2$—CH=CH—CH$_2$—. Suitable alkynylene radicals contain 3 to 12, in particular 4 to 8, more particularly 4 to 6 carbon atoms, for example —CH$_2$—C≡C—CH$_2$—. Suitable cycloalkylene radicals contain 3 to 12, in particular 5 to 8, more preferably 5 or 6 carbon atoms, eg 1,2-cyclopentylene, and 1,2- or 1,4-cyclohexylene. Suitable cycloalkylalkylene radicals include C$_{3-8}$cycloalkylC$_{1-9}$alkylene radicals, in particular C$_{5-6}$cycloalkylC$_{2-4}$alkylene radicals.

As indicated, such radicals may be substituted by the substituents indicated. Suitable haloalkyl substituted include halomethyl and haloethyl, for example chloromethyl and bromomethyl. Suitable alkoxy substituents include methoxy and ethoxy and suitable alkenyloxy substituents include alkyloxy. Suitable alkyl radicals interrupted by oxygen in the chain, include methoxyethyl and ethoxymethyl. Suitable halosubstituted alkenyl radicals include —CH$_2$ C(Br)=C(Br)—CH$_2$—.

R preferably signifies alkylene of 2 to 12, in particular 3 to 8 carbon atoms, optionally substituted by halogen.

As used herein, halogen means chlorine, fluorine or bromine, in particular, chlorine or bromine.

Particular compounds of formula II include the following:

ethylene glycol, 1,2-propylene glycol, 1,3-propylene glycol, 1,4-butylene glycol, 1,2-cyclopentane diol, 1,4- and 1,2-cyclohexane diol, 1,3-butane diol, 2,3-butane diol, tetramethylethylene glycol, glycerin 1-allylether, chloromethyl ethylene glycol, 2-methyl-1,3-propane diol, 2-ethyl-1,3-propane diol, 2,2-dimethyl-1,3-propane diol, 2-ethyl-2-methyl-1,3-propane diol, 2,2-diethyl-1,3-propane diol, 2-methyl-2-propyl-1,3-propane diol, 2-ethyl-2-butyl-1,3-propane diol, 2-chloromethyl-1,3-propane diol, 2,2-bis-chloromethyl-1,3-propane diol, 2-bromomethyl-1,3-propane diol, 2-methyl-2-bromomethyl-1,3-propane diol, 2,2-bis-bromomethyl-1,3-propane diol, 2-methyl-2,4-pentane diol, 3-methyl-2,4-heptane diol, 2,2-dimethyl-1,3-hexane diol, 2-ethyl-1,3-hexane diol, 2-ethyl-2-methyl-1,3-propane diol, 2,2,4-trimethyl-1,3-pentane diol, 2-ethyl-2-allyloxymethyl-1,3-propane diol and 2-methyl-2-phenyl-1,3-propane diol.

Preferred compounds of formula II include those of formula IIa,

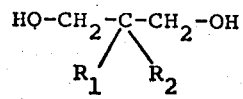   IIa in which R$_1$ and R$_2$, which may be the same or different, each signifies hydrogen, alkyl of 1 to 4 carbon atoms, or mono-, di- or tri-haloalkyl of 1 to 4 carbon atoms, in particular, compounds of formula IIaa,

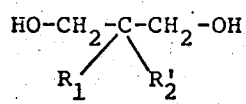   IIaa in which R$_1$ is as defined above, and R$_2'$ signifies alkyl of 1 to 4 carbon atoms or mono-, di- or tri-haloalkyl of 1 to 4 carbon atoms preferably, compounds of formula IIab,

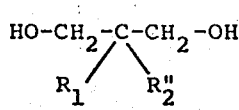   IIab in which R$_1$ is as defined above, and R$_2''$ signifies mono-, di- or tri-haloalkyl of 1, 2 or 3 carbon atoms.

compounds of formula IIac,

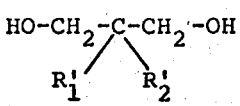   IIac in which R$_2'$ is as defined above, and R$_1'$ signifies alkyl of 1 to 4 carbon atoms, or mono-, di-, or tri-haloalkyl of 1 to 4 carbon atoms, and compounds of formula IIad,

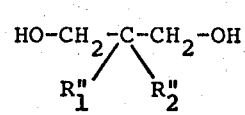   IIad in which R$_2''$ is as defined above, and R$_1'$ signifies mono-, di- or tri-haloalkyl of 1, 2 or 3 carbon atoms.

In the above preferred compounds, suitable alkyl substituents include methyl, ethyl, propyl, n-butyl and sec-butyl, in particular methyl, and suitable haloalkyl substituents include chloromethyl and bromomethyl.

Particularly preferred compounds of formula II include 2,2-dimethyl-1,3-propane diol, 2,2-bis-chloromethyl-1,3-propane diol and 2,2-bis-bromomethyl-1,3-propane diol.

As indicated, the present invention provides regenerated cellulose or cellulose derivatives of reduced flammability by employing the flame retardants described above. These flame retardants do not materially affect other properties of the regenerated cellulose and the regenerated cellulose does not appear to lose its reduced flammability even after repeated aqueous treatments.

The following Examples, in which percentages are by weight and temperatures in degrees centigrade, illustrate the invention. The symbol $p$ indicates "parts by weight."

EXAMPLE 1

A reaction vessel, made from a material which is resistant to hydrogen chloride, is fitted with a stirrer, thermometer, dropping funnel, gas inlet tube and reflux condenser.

The vessel is charged with phosphorus trichloride (13.75 p), finely ground ammonium chloride (5.9 p) and tetrachloroethane (98.0 p). At room temperature, chlorine (7.1 p) is passed into the mixture which is then thoroughly stirred and refluxed (120-135°) for about 10 hours during which a reaction takes place with elimination of hydrogen chloride. The mixture is cooled to 60° and practically all of the tetrachloroethane removed by vacuum distillation, to leave a residue comprising oligomers of formula I.

At room temperature 2,2-dimethyl-1,3-propane diol (10.4 p) and tetrahydrofuran (26.5 p) are added to the oligomers of formula I. Pyridine (16.0 p) is added over a period of 5-60 minutes during which time the temperature of the reaction mixture may reach 70°. The mixture is refluxed for at least 8 hours, cooled to about 20° and left to stand for a few hours. Pyridine hydrochloride (approximately 21 p) precipitates from the mixture and is removed by filtration followed by washing with tetrahydrofuran (8.8 p). The filtrate and wash solution are combined and evaporated at 70°; initially at atmospheric pressure and subsequently under reduced pressure which is decreased to about 20 torr. A residue (approximately 15 p) is obtained in the form of a brownish, highly viscous oil. This residue is dissolved in trichloroethylene (15.0 p) to provide a solution containing approximately 50% of a mixture of products formed by the reaction of oligomers of formula I and 2,2-dimethyl-1,3-propane diol. The solution can be utilised, as described in Example 2, without further purification in the production of regenerated cellulose materials of low flammability.

EXAMPLE 2

The solution of products (7.2 p) as prepared in Example 1 is stirred into a cellulose xanthate solution (200 p) containing $\alpha$-cellulose (18.0 p) and cast in uniform thickness (0.5 mm) on to a glass plate. The plate and solution are immersed for 2 to 4 minutes in a precipitating bath containing, per litre of water, sulphuric acid (125 p), anhydrous sodium sulphate (240 p) and anhydrous zinc sulphate (12.0 p). A film is formed on the glass plate. This film is then washed;
i. for 2 minutes in a bath of dilute sulphuric acid,
ii. for 2 minutes in a water bath at 50° and
iii. for 4 minutes in a weakly alkaline solution containing, per litre of water, sodium carbonate (3.3 p) and sodium hydrogen carbonate (1.75 g)

Finally the film is rinsed with water at about 40° and then dried. The resulting film has a thickness of approximately 0.05 mm.

EXAMPLE 3

The solution of products (7.2 p) as prepared in Example 1, is stirred into a cellulose xanthate solution (200 p) having the composition referred to in Example 2. De-aeration of the combined solution is carried out under reduced pressure for 3 to 5 hours during which a surface foam results. After standing for 2 to 3 hours (at 40°) to allow the surface foam to settle, the combined solution is spun from a laboratory spinning machine into a precipitating bath (the composition of which is described in Example 2) to form a continuous multifilament with a total denier of 187.5 (50 monofilaments). The multifilament is then
i. washed for 7 minutes with water at 70°
ii. desulphurised by treatment for 30 minutes in an alkaline solution (at 70°) containing, per litre of water, sodium carbonate (3.3 p) and sodium hydrogen carbonate (1.75 p)
iii. washed in a soap bath for 20 minutes at 70° and
iv. dried.

The filaments produced may be converted into fabrics of low flammability.

EXAMPLE 4

The procedures of Examples 2 and 3, may be carried out by using an aqueous dispersion of the products of the reaction between oligomers of formula I and a glycol or glycols, in place of the solution prepared in Example 1.

A dispersion for the above application may be produced as follows. The residue (15.0 p), described in Example 1 as a brownish, highly viscous oil, is vigorously mixed with water (100 p) for 3 hours. An easily filterable precipitate is produced and this is separated by decanting. After washing with water the precipitate is filtered and dried thereby providing 15.0 g of a white powder. The powder (15.0 p) and a dispersing agent (1.5 p) are added to water (26.5 p) in a bead mill containing quartzite beads (40.0 p). These components are ground for 5 hours (1000 revolutions per minute) with external ice cooling. After separation of the glass beads by filtration, a dispersion (43.0 p) is obtained, containing approximately 35% of a substance which is an active flame retarder. The dispersion (10.3 p) is made alkaline by the addition of a few drops of dilute sodium hydroxide solution and stirred into a cellulose xanthate solution (200 p) having the composition described in Example 2.

Films or multifilaments may be produced from this mixture in the manner indicated in Examples 2 and 3 respectively.

EXAMPLE 5

At room temperature 2,2-bis-(bromomethyl)-1,3-propane diol (26.2 p) and tetrahydrofuran (26.5 p) are added to oligomers of formula I produced as described in Example 1. Pyridine (16.0 p) is added over a period of 5 to 10 minutes during which time the temperature of the resulting mixture increases. The mixture is refluxed for 8 to 12 hours and then cooled. Pyridine hydrochloride is precipitated and removed by filtration; the filtrate being concentrated by evaporation under reduced pressure (70°, 20 torr) to yield a highly viscous melt. The melt is heated to 100°-120° and quenched in ice-water (500 p) wherein a solid is produced which is pulverised by vigorous stirring to give a powder. Subsequently the powder is filtered, washed with water and dried to provide a white powder (30.0 p). The powder (30 p) and a dispersing agent (7.5 p)

are added to water (82.5 p) contained in a quartzite bead mill where grinding is carried out as described in Example 4. After filtration, a dispersion (120 p) is obtained which contains approximately 25% of a material which is an active flame retarder. This material is a mixture of the products of the reaction between oligomers of formula I and 2,2-bis-(bromomethyl)-1,3-propane diol. The dispersion (10.8 p) is made alkaline by adding a few drops of dilute sodium hydroxide solution and stirred into a cellulose xanthate solution (200 p) having the composition described in Example 2.

Films or multifilaments may be produced from this mixture in the manner indicated in Examples 2 and 3 respectively.

EXAMPLE 6

At room temperature 2,2-diethyl-1,3-propane diol (13.2 p) and tetrahydrofuran (44.0 p) are added to oligomers of formula I produced as in Example 1. Pyridine (17.0 p) is added over a period of 5 to 10 minutes during which time the temperature of the reaction mixture increases. The mixture is then refluxed for 20 hours and cooled. Pyridine hydrochloride is precipitated and filtered off; the filtrate being concentrated by evaporation under reduced pressure (70°, 20 torr), to yield an oily residue. This residue is dissolved in chloroform and the solution washed three times with water. The chloroform phase is separated, dried with anhydrous sodium sulphate and the chloroform distilled off to leave a pale yellowish viscous oil which partly crystallises. The oil is dissolved in tetrachloroethylene (11.5 p) to produce a solution containing approximately 60% of a mixture of the products of the reaction between oligomers of formula I and 2,2-diethyl-1,3-propane diol. This solution (6.0 p) is stirred into a cellulose xanthate solution (200 p) having the composition referred to in Example 2.

Films or multifilaments may be produced from this mixture in the manner indicated in Examples 2 and 3 respectively.

EXAMPLE 7

The procedure is carried out in a manner analogous to that of Example 6 except that 2,2-bis-diethyl-1,3-propane diol (13.2 p) is replaced by an equivalent amount of 2-methyl-2-propyl-1,3-propane diol. A viscous, slightly yellowish oil (17.0 p) is obtained and dissolved in trichloroethylene (11.5 p). This solution contains approximately 60% of a mixture of products produced by the reaction between oligomers of formula I and 2-methyl-2-propyl-1,3-propane diol. The solution (6.0 p) is stirred into a cellulose xanthate solution (200 p) having the composition referred to in Example 2.

Films or multifilaments may be produced from this mixture in the manner indicated in Examples 2 and 3 respectively.

EXAMPLE 8

The procedure is carried out in a manner analogous to that of Example 6 except that 2,2-diethyl-1,3-propane diol (13.2 p) is replaced by 2-ethyl-2-n-butyl-1,3-propane diol. A yellowish oil (20.0 p) is obtained. The oil (3.6 p) is stirred into a cellulose xanthate solution (200 p) having the composition referred to in Example 2.

Films or multifilaments may be produced from this mixture in the manner indicated in Examples 2 and 3 respectively.

EXAMPLE 9

The procedure is carried out in a manner analogous to that of Example 6 except that 2,2-diethyl-1,3-propane diol (13.2 p) is replaced by 2-ethyl-2-allyloxymethyl-1,3-propane diol (17.4 p). A yellowish oil (21.0 p) is obtained. The oil (3.6 p) is stirred into a cellulose xanthate solution (200 p) having the composition referred to in Example 2.

Films or multifilaments may be produced from this mixture in the manner indicated in Examples 2 and 3 respectively.

EXAMPLE 10

At room temperature 1,2-cyclohexane diol (cis/trans mixture; 11.6 p) and tetrahydrofuran (44.0 p) are added to oligomers of formula I produced as described in Example 1. Pyridine (17.0 p) is added over a period of 10 minutes during which the temperature of the reaction mixture increases. The mixture is allowed to react for a period of 24 hours at 50° and then cooled. Pyridine hydrochloride is precipitated and filtered; the filtrate being concentrated by evaporation under reduced pressure (70° 20 torr) to yield an oily yellowish residue which is partly crystalline. The residue is dissolved in isopropanol (40.0 p) and the solution run into an ice-water mixture (300 p). A precipitate forms which is filtered, washed with water and dried to give a white solid (14.5 p). The solid, together with a dispersing agent (3.5 p) is added to water (40.0 p) in a quartzite bead mill and ground in the manner described in Example 4. After filtration, a dispersion (58.0 p) is obtained which contains approximately 25% of the products formed by the reaction between oligomers of formula I and 1,2-cyclohexane diol. The dispersion (10.8 p) is made alkaline by the addition of a few drops of dilute sodium hydroxide solution and stirred into a cellulose xanthate solution (200 p) having the composition referred in Example 2.

Films or multifilaments may be produced from this mixture in the manner indicated in Examples 2 and 3 respectively.

EXAMPLE 11

The procedure is carried out in a manner analogous to Example 5 except that 2,2-bis-(bromomethyl) -1,3-propane diol (10.4 p) is replaced by a mixture of 2,2-dimethyl-1,3-propane diol (6.95 p) and 1,4-cyclohexane diol (3.9 p). A white solid (13.6 p) is obtained and added, together with a dispersing agent (3.4 p) to water (37.4 p) in a quartzite bead mill where grinding in effected under the conditions described in Example 4. After filtration, a dispersion (54.4 p) is obtained which contains approximately 25% of the products of the reaction between oligomers of formula I and a mixture of 2,2-dimethyl-1,3-propane diol and 1,4-cyclohexane diol. The dispersion (10.8 p) in made alkaline by the addition of a few drops of dilute sodium hydroxide solution and stirred into a solution of cellulose xanthate (200 p) having the composition referred to in Example 2.

Films or multifilaments may be produced from this mixture in the manner indicated in Examples 2 and 3 respectively.

EXAMPLE 12

The procedure is carried out in manner analogous to Example 5 except that 2,2-bis-(bromomethyl)-1,3-propane diol (10.4 p) is replaced by a mixture of 2,2-dimethyl-1,3-propane diol (6.95 p) and 1,5-pentane diol (3.5 p). A white solid (13.2 p) is obtained and added, together with a dispersing agent (3.3 p) to water (36.5 p) in a quartzite bead mill where grinding is effected under the conditions described in Example 4. After filtration, a dispersion (5.3 p) is obtained which contains approximately 25% of the products of the reaction between oligomers of formula I and a mixture of 2,2-dimethyl-1,3-propane diol and 1,5-pentane diol. The dispersion (10.8 p) is made alkalene by the addition of a few drops of dilute sodium hydroxide solution and stirred into a cellulose xanthate solution (200 p) having the composition referred to in Example 2.

Films or multifilaments may be produced in Examples 2 and 3 respectively.

EXAMPLE 13

At room temperature 2,2-dimethyl-1,3-propane diol (6–95 p) 1,8-octane diol (4.87 p) and tetrahydrofuran (44.0 p) are added to oligomers of formula I produced as described in Example 1. Pyridine (16.0 p) is added over a period of 5 to 10 minutes during which the temperature of the resulting mixture increases. The mixture is refluxed for 8 hours, cooled and run into water (400 p) with vigorous stirring. A precipitate is formed, removed by filtration, dried and finely ground in a pin disk mill to yield a white powder (14.5 p). The powder, together with a dispersing agent (3.6 p), is added to water (40.0 p) in a quartzite bead mill and ground in the manner described in Example 4. After filtration, a dispersion (58 p) is obtained which contain approximately 25% of the products of the reaction between oligomers of formula I and a mixture of 2,2-dimethyl-1,3-propane diol and 1,8-octane diol. The dispersion (10.8 p) is made alkaline with a few drops of dilute sodium hydroxide solution and stirred into a cellulose xanthate solution (200 p) having the composition referred to in Example 2.

Films or multifilaments may be produced from this mixture in the manner indicated in Examples 2 and 3 respectively.

EXAMPLE 14

The procedure is carried out in a manner analogous to Example 13 except that the mixture at 2,2-dimethyl-1,3-propane diol (6.95 p) and 1,8-octane diol (4.87 p) is replaced by 1,4-butane diol (9.0 p). A white solid (12.0 p) is produced which, together with a dispersing agent (3.0 p) is added to water (33.0 p) in a quartzite bead mill where grinding is effected under the conditions described in Example 4. After filtering, a dispersion (48.0 p) is obtained which contains approximately 25% of the products formed by the reaction between oligomers of formula I and 1,4-butane diol. The dispersion (10.8 p) is stirred into cellulose xanthate solution (200 p) having the composition referred to in Example 2.

Films or multifilaments may be produced from this mixture in the manner indicated in Examples 2 and 3 respectively.

What is claimed is:

1. In a process for the production of regenerated cellulose of reduced flammability, the improvement of precipitating the cellulose from a solution of cellulose, containing a reaction product of
   a. at least one compound of formula I,

$(NPCl_2)_n$  I in which n signifies at least 3,
   b. at least one compound of formula II, and

HO—R—OH  II in which R signifies a radical selected from alkylene, cycloalkylene, cycloalkyl-alkylene, alkenylene and alkynylene, which radical contains up to 12 carbon atoms and is unsubstituted or substituted
   i. by 1 to 4 substituents selected from fluorine, chlorine, bromine, alkyl of 1 to 4 carbon atoms, methoxyethyl, ethoxyethyl, and mono-, di- or tri- fluoro-, chloro- or bromoalkyl of 1 to 4 carbon atoms,
   ii. by 1 or 2 alkoxy or alkenyloxy radicals of 1 to 4 carbon atoms, or
   iii. by 1 phenyl radical.

2. The improvement according to claim 1, in which the solution contains from 4 to 35 % of the reaction product, based on the weight of cellulose or derivative thereof.

3. The improvement according to claim 1, in which the solution contains from 8 to 15 % of the reaction product, based on the weight of cellulose or derivative thereof.

4. A process according to claim 1, wherein the reaction product is a reaction product of a compound of formula I, in which $n$ is 3 to 12 and at least one compound of formula IIac

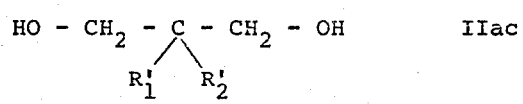

HO - CH$_2$ - C - CH$_2$ - OH     IIac
              R$_1'$  R$_2'$ in which R$_1'$ and R$_2'$ are alkyl of 1 to 4 carbon atoms, chloromethyl or bromomethyl.

5. Regenerated cellulose of reduced flammability, having incorporated therein a reaction product of
   a. at least one compound of formula I,

$(NPCl_2)_n$  I in which n signifies at least 3, and,
   b. at least one compound of formula II,

HO—R—OH  II in which R signifies a radical selected from alkylene, cycloalkylene, cycloalkyl-alkylene, alkenylene, and alkynylene, which radical contains up to 12 carbon atoms and is unsubstituted or substituted
   (i) by 1 to 4 substituents selected from fluorine, chlorine, bromine, alkyl of 1 to 4 carbon atoms, methoxyethyl, ethoxymethyl, and mono-, di- or trifluoro-, chloro- or bromoalkyl of 1 to 4 carbon atoms,
(ii) by 1 or 2 alkoxy or alkenyloxy radicals of 1 to 4 carbon atoms, or
(iii) by 1 phenyl radical, and produced by the process of claim 1.

6. A composition according to claim 5 wherein any halo substituent in the compound of formula II is chloro or bromo.

7. Regenerated cellulose, according to claim 5, incorporating 8 to 15 % by weight of the reaction product.

8. Regenerated cellulose, according to claim 6, in which the reaction product is a reaction product of a compound of formula I, in which n is 3 to 12, and at least one compound of formula IIa,

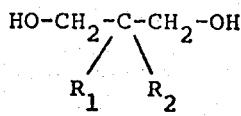      IIa in which $R_1$ and $R_2$, which may be the same or different, each signifies hydrogen, alkyl of 1 to 4 carbon atoms, or mono- di- or tri-haloalkyl of 1 to 4 carbon atoms.

9. Regenerated cellulose, according to claim 8, in which the reaction product is a reaction product of a compound of formula I, in which n is 3 to 12, and at least one compound of formula IIaa,

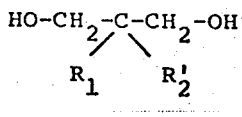      IIaa in which $R_1$ is as defined in claim 8, and
$R_2'$ signifies alkyl of 1 to 4 carbon atoms or mono-, di- or tri-haloalkyl of 1 to 4 carbon atoms.

10. Regenerated cellulose, according to claim 8, in which the reaction product is a reaction product of a compound of formula I, in which n is 3 to 12, and at least one compound of formula IIab,

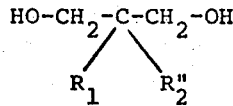      IIab in which $R_1$ is as defined in claim 8, and $R_2''$ signifies mono-, di- or tri-haloalkyl of 1, 2 or 3 carbon atoms.

11. Regenerated cellulose, according to claim 9, in which the reaction product is a reaction product of a compound of formula I, in which n is 3 to 12, and at least one compound of formula IIac,

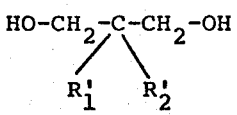      IIac in which $R_2'$ is as defined in claim 9, and $R_1'$ signifies alkyl of 1 to 4 carbon atoms, or mono-, di- or tri-haloalkyl of 1 to 4 carbon atoms.

12. Regenerated cellulose, according to claim 10, in which the reaction product is a reaction product of a compound of formula I, in which n is 3 to 12, and at least one compound of formula IIad,

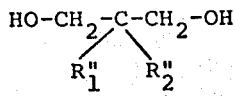      IIad in which $R_2''$ is as defined in claim 10, and $R_1''$ signifies mono-, di- or tri-haloalkyl of 1, 2 or 3 carbon atoms.

13. Regenerated cellulose, according to claim 6, in which the reaction product is a reaction product of a compound of formula I, in which n is 3 or 4 and at least one compound of formula IIa,

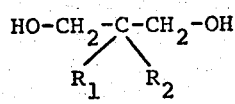      IIa in which $R_1$ and $R_2$, which may be the same or different, each signifies hydrogen, alkyl of 1 to 4 carbon atoms, or mono-, di- or tri-haloalkyl of 1 to 4 carbon atoms.

14. Regenerated cellulose, according to claim 13, in which the reaction product is a reaction product of a compound of formula I, in which n is 3 or 4 and at least one compound of formula IIaa,

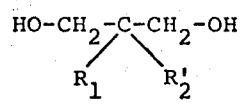      IIaa in which $R_1$ is as defined in claim 13, and $R_2'$ signifies alkyl of 1 to 4 carbon atoms or mono-, di- or tri-haloalkyl of 1 to 4 carbon atoms.

15. Regenerated cellulose, according to claim 13, in which the reaction product is a reaction product of a compound of formula I, in which n is 3 or 4 and at least one compound of formula IIab,

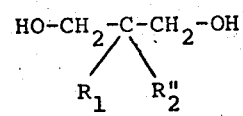      IIab in which $R_1$ is as defined in claim 13, and $R_2'$ signifies mono-, di- or tri-haloalkyl of 1, 2 or 3 carbon atoms.

16. Regenerated cellulose, according to claim 14, in which the reaction product is a reaction product of a compound of formula I, in which n is 3 or 4 and at least one compound of formula IIac,

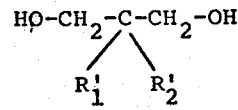      IIac in which $R_2'$ is as defined in claim 14, and $R_1'$ signifies alkyl of 1 to 4 carbon atoms, or mono-, di- or tri-haloalkyl of 1 to 4 carbon atoms.

17. Regenerated cellulose, according to claim 15, in which the reaction product is a reaction product of a compound of formula I, in which $n$ is 3 or 4 and at least one compound of formula IIad,

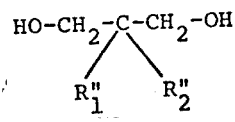 IIad in which $R_2''$ is as defined in claim 15, and $R_1''$ signifies mono-, di- or tri-haloalkyl of 1, 2 or 3 carbon atoms.

18. A composition according to claim 8, wherein any haloalkyl substituent in the compound of formula II is chloromethyl or bromomethyl.

19. A composition according to claim 11, wherein any haloalkyl substituent in the compound of formula IIac is chloromethyl or bromomethyl.

20. Regenerated cellulose, according to claim 5, incorporating 4 to 35 % by weight of the reaction product.

* * * * *